US012609210B2

(12) United States Patent
Kawasaki et al.

(10) Patent No.: US 12,609,210 B2
(45) Date of Patent: Apr. 21, 2026

(54) CURABLE COMPOSITION AND CURED BODY OF SAME

(71) Applicant: TOKUYAMA CORPORATION, Yamaguchi (JP)

(72) Inventors: Takayoshi Kawasaki, Yamaguchi (JP); Junji Takenaka, Yamaguchi (JP); Junji Momoda, Yamaguchi (JP)

(73) Assignee: TOKUYAMA CORPORATION, Yamaguchi (JP)

( * ) Notice: Subject to any disclaimer, the term of this patent is extended or adjusted under 35 U.S.C. 154(b) by 645 days.

(21) Appl. No.: 18/015,679

(22) PCT Filed: Jul. 13, 2021

(86) PCT No.: PCT/JP2021/026295

§ 371 (c)(1),
(2) Date: Jan. 11, 2023

(87) PCT Pub. No.: WO2022/014591

PCT Pub. Date: Jan. 20, 2022

(65) Prior Publication Data

US 2023/0260669 A1 Aug. 17, 2023

(30) Foreign Application Priority Data

Jul. 17, 2020 (JP) ................................ 2020-122700
Aug. 5, 2020 (JP) ................................ 2020-133195

(51) Int. Cl.
*G21F 1/10* (2006.01)
*C08F 2/44* (2006.01)
*C08F 230/02* (2006.01)
*C09K 9/00* (2006.01)

(52) U.S. Cl.
CPC ................ *G21F 1/103* (2013.01); *C08F 2/44* (2013.01); *C08F 230/02* (2013.01); *C09K 9/00* (2013.01); *C09K 2211/1088* (2013.01); *C09K 2211/1096* (2013.01)

(58) Field of Classification Search
None
See application file for complete search history.

(56) References Cited

U.S. PATENT DOCUMENTS

| | | | | |
|---|---|---|---|---|
| 4,820,748 | A | 4/1989 | Yamamori et al. | |
| 4,835,231 | A | 5/1989 | Yamamori et al. | |
| 6,113,813 | A * | 9/2000 | Goudjil | G03C 1/685 252/589 |
| 7,053,013 | B1 | 5/2006 | Nosov et al. | |
| 9,951,552 | B2 * | 4/2018 | Veerasamy | G02F 1/13306 |
| 10,026,513 | B2 | 7/2018 | Cardon et al. | |
| 2004/0049040 | A1 * | 3/2004 | Irie | C07D 277/34 548/215 |
| 2010/0234498 | A1 | 9/2010 | Iwazumi et al. | |
| 2021/0070790 | A1 | 3/2021 | Kawasaki et al. | |

FOREIGN PATENT DOCUMENTS

| | | | |
|---|---|---|---|
| EP | 1359170 | B1 | 7/2008 |
| JP | S63-056510 | A | 3/1988 |
| JP | S63-72768 | A | 4/1988 |
| JP | H10-512877 | A | 12/1998 |
| JP | 2001-083288 | A | 3/2001 |
| JP | 2002-333478 | A | 11/2002 |
| JP | 2005-082507 | A | 3/2005 |
| JP | 2006-070033 | A | 3/2006 |
| JP | 2012-087070 | A | 5/2012 |
| JP | 2017-516991 | A | 6/2017 |
| JP | 2020-094128 | A | 6/2020 |
| RU | 2121177 | C1 | 10/1998 |
| TW | 201940496 | A | 10/2019 |
| WO | 96/22994 | A1 | 8/1996 |
| WO | 2006/026065 | A2 | 3/2006 |
| WO | 2007/105355 | A1 | 9/2007 |
| WO | 2015/051196 | A1 | 4/2015 |
| WO | 2015/187265 | A1 | 12/2015 |
| WO | 2019/177084 | | 9/2019 |

OTHER PUBLICATIONS

Wei Li "Facile synthesis of monodisperse Bi2O3 nanoparticles" Materials Chemistry and Physics, vol. 99, pp. 174-180 (2006) Published on : Dec. 15, 2005 (7 pages).

M Mallahi et al., "Synthesis and characterization of Bismuth oxide nanoparticles via sol-gel method" American Journal of Engineering Research, vol. 3, pp. 162-165 (2014) Published on Jan. 2014 (4 pages).

Linda Miersch et al,."Organic-inorganic hybrid materials starting from the novel nanoscaled bismuth oxido methacrylate cluster [Bi38O45(OMc)24(DMSO)9]-2DMSO—7H2O" Chemical Communications, vol. 47, pp. 6353-6355 (2011) Published on May 3, 2011 (3 pages).

International Search Report issued in corresponding International Application No. PCT/JP2021/026295 mailed Sep. 28, 2021 (7 pages).

Written Opinion issued in corresponding International Application No. PCT/JP2021/026295 mailed Sep. 28, 2021 (4 pages).

Office Action issued in counterpart Russian Patent Application No. 2022133376 mailed Jul. 29, 2024 (13 pages).

(Continued)

*Primary Examiner* — Joseph D Anthony

(74) *Attorney, Agent, or Firm* — Osha Bergman Watanabe & Burton LLP

(57) ABSTRACT

The present invention provides: a curable composition which contains a bismuth compound, wherein a phosphoric acid ester having a (meth)acryloyl group is bonded to bismuth, and a nitrile compound having a radically polymerizable carbon-carbon double bond; a cured body which is obtained by curing this curable composition; a multilayer body which is composed of the above-described cured body and a cured body that is obtained by curing a photochromic curable composition; and a radiation protective material which is formed of the above-described cured body or the above-described multilayer body.

5 Claims, No Drawings

(56) References Cited

OTHER PUBLICATIONS

Extended European Search Report issued in the counterpart European Patent Application No. 21842859.7 mailed Aug. 9, 2024 (5 pages).
Office Action issued in the counterpart Taiwanese Patent Application No. 110125831 mailed Sep. 19, 2024 (18 pages).
Office Action issued in Indian Patent Application No. 202237071554, dated Dec. 30, 2025 (8 pages).

* cited by examiner

CURABLE COMPOSITION AND CURED BODY OF SAME

TECHNICAL FIELD

The present invention relates to a novel curable composition containing a bismuth compound, and a novel cured product obtained by curing the curable composition.

BACKGROUND ART

It is a serious problem that cataracts are induced by the influence of X-rays on the crystalline lens of the eyeball, and an optical material that effectively shields from X-rays has been desired. Although lead glass generally known as such an optical material has high X-ray shielding ability, a problem is that regular use thereof is difficult due to the large specific gravity. Use of a so-called lightweight shielding material is sufficient to protect the human body from stray X-rays that have indirect effects through reflection or diffusion different from directly incident X-rays. Accordingly, an optical shielding material made of lightweight lead acrylic is also used. However, lead is harmful to the environment, so that an alternative without use of lead has been highly desired even for lightweight shielding materials.

Among many metal elements such as barium, antimony, tin, and tungsten listed as candidate elements for lead substitution, bismuth-containing materials have been studied. Bismuth has been used as a gastrointestinal drug since long ago, having high X-ray shielding ability as well as harmlessness to the human body, and being suitable as a substitute for lead.

For example, as a method for producing a bismuth-containing material, a method of directly kneading bismuth or an inorganic bismuth compound into an organic material is known (refer to Patent Document 1). According to the method, bismuth or an inorganic bismuth compound may be blended into various organic materials.

However, this method has room for improvement because bismuth or an inorganic bismuth compound is required to be highly kneaded into an organic material for sufficient dispersion. In addition, since the resulting material is colored and opaque, it cannot be used for protective goggles or the like.

It is known that an organic group is coordinated to bismuth in order to facilitate dispersion of bismuth in an organic material (refer to Patent Document 2, Non-Patent Documents 1 and 2). A compound with an organic group coordinated to bismuth has improved compatibility with an organic material, which allows easy dispersion of the compound in an organic material. Examples of the organic group to be coordinated to bismuth include an alkyl group, an aryl group (refer to Patent Document 2) and a polyethylene glycol chain (refer to Non-Patent Documents 1 and 2).

In order to produce a material with a bismuth compound dispersed in an organic material more easily and efficiently, it is preferable to employ, for example, a method including mixing a radically polymerizable monomer and a bismuth compound to produce a curable composition, and then polymerizing the curable composition to produce a cured product.

However, since the compound with an organic group coordinated to bismuth has no polymerizable group capable of participating in polymerization of a radically polymerizable monomer, when this compound is used, no cured product may be produced due to insufficient polymerization of the curable composition in some cases.

For dispersion of bismuth in a cured product with use of a curable composition containing a radically polymerizable monomer, it is conceivable to use a compound with a polymerizable group such as (meth)acrylic acid coordinated to bismuth (refer to Non-Patent Document 3 and Patent Document 3).

The compound described in Non-Patent Document 3 includes dimethyl sulfoxide (DMSO) coordinated in addition to (meth)acrylic acid, being excellent in solubility. However, due to containing DMSO, the compound described in Non-Patent Document 3 has difficulty in high-degree cross-linking (polymerization), remaining room for improvement. Further, in Non-Patent Document 3, only production of a cured product through copolymerization with methyl methacrylate in dimethylformamide (DMF) is shown. As a result of the study by the present inventors, it has been found that due to polymerization in a solution, it is difficult for the cured product to contain bismuth at a high concentration.

Meanwhile, the compound described in Patent Document 3 has salicylic acid bonded in addition to (meth)acrylic acid. However, according to the study by the present inventors, it has been found that the compound has extremely low solubility in general organic solvents as well as in other monomers, and as a result, it is difficult for the cured product to contain bismuth at high concentration. Further, it has been found that a cured product of the bismuth-containing compound mixed with a general monomer has very low impact resistance, achieving only a strength that allows easy fracture by dropping of the cured product itself.

Patent Document 1: Japanese Unexamined Patent Application, Publication No. 2001-83288

Patent Document 2: Japanese Unexamined Patent Application (Translation of PCT Application), Publication No. H10-512877

Patent Document 3: Japanese Unexamined Patent Application (Translation of PCT Application), Publication No. 2017-516991

Non-Patent Document 1: Materials Chemistry and Physics, Vol. 99, pp. 174-180 (2006)

Non-Patent Document 2: American Journal of Engineering Research, Vol. 3, pp. 162-165 (2014)

Non-Patent Document 3: Chemical Communications, Vol. 47, pp. 6353-6355 (2011)

DISCLOSURE OF THE INVENTION

Problems to be Solved by the Invention

An object of the present invention is to provide a curable composition that contains a polymerizable bismuth compound having high solubility in an organic material, particularly in a radically polymerizable monomer, from which a cured product having high transparency with reduced coloring, and practical mechanical properties may be formed, and a cured product obtained by curing the curable composition.

Means for Solving the Problems

Specific means for solving the above problems include the following embodiments.

<1> A curable composition, containing: a bismuth compound in which a phosphoric acid ester having a (meth)acryloyl group is bonded to bismuth; and a nitrile compound having a radically polymerizable carbon-carbon double bond.

<2> The curable composition according to <1>, further containing a compound having one radically polymerizable carbon-carbon double bond and being different from the bismuth compound and the nitrile compound.

<3> The curable composition according to <1> or <2>, wherein the bismuth compound includes a bismuth compound in which salicylic acid or (meth)acrylic acid and a phosphoric acid ester having a (meth)acryloyl group are bonded to bismuth.

<4> The curable composition according to any one of <1> to <3>, further containing at least one compound selected from a compound represented by the following formula (1):

(1)

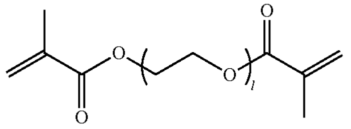

in the formula, 1 represents an integer of 7 to 14, and a compound represented by the following formula (2):

(2)

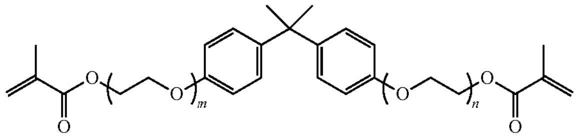

in the formula, n and m each independently represent an integer of 1 to 15, and n+m=2 to 30.

<5> The curable composition according to any one of <1> to <4>, further containing a photochromic compound.

<6> A cured product obtained by curing the curable composition according to any one of <1> to <5>.

<7> A multilayer body including a cured product obtained by curing the curable composition according to any one of <1> to <4>, and a cured product obtained by curing a photochromic curable composition containing a photochromic compound.

<8> A radiation protective material including the cured product according to <6> or the multilayer body according to <7>.

Effects of the Invention

According to the present invention, a curable composition that contains a polymerizable bismuth compound having high solubility in an organic material, particularly in a radically polymerizable monomer, from which a cured product having high transparency with reduced coloring, and practical mechanical properties may be formed, and a cured product obtained by curing the curable composition can be provided.

PREFERRED MODE FOR CARRYING OUT THE INVENTION

Hereinafter specific embodiments to which the present invention is applied are described in detail.

In the present specification, unless otherwise specified, notation "x to y" using numerical values x and y means "x or more and y or less". When a unit is attached to numerical value y only in the notation, it is presumed that the unit is also attached to numerical value x.

Further, in the present specification, term "(meth)acryloyl" means both "acryloyl" and "methacryloyl". Similarly, term "(meth)acrylic acid" means both "acrylic acid" and "methacrylic acid".

<<Curable Composition>>

Curable compositions in the present embodiment contains a bismuth compound in which a phosphoric acid ester having a (meth)acryloyl group is bonded to bismuth (hereinafter referred to also as "phosphoric acid ester-bonded bismuth compound") and a nitrile compound having a radically polymerizable carbon-carbon double bond.

<Phosphoric Acid Ester-Bonded Bismuth Compound>

The phosphoric acid ester-bonded bismuth compound is a compound in which a phosphoric acid ester having a (meth) acryloyl group (hereinafter simply referred to also as "phosphoric acid ester") is bonded to bismuth. The compound has high solubility, particularly, high solubility in a radically polymerizable monomer in a solution state, so that bismuth may be contained at a high concentration in a cured product to improve the physical properties of the cured product. The phosphoric acid ester-bonded bismuth compound has higher solubility in a radically polymerizable monomer than bismuth subsalicylate described in the following.

Incidentally, the bonding aspect between bismuth and a phosphoric acid ester having a (meth)acryloyl group is not particularly limited, and may be any one of an ionic bond and a coordination bond.

Examples of the phosphoric acid ester-bonded bismuth compound include a compound in which the phosphoric acid ester being a phosphoric acid monoester having one (meth) acryloyl group (for example, 2-(methacryloyloxy)ethyl dihydrogen phosphate) and a compound in which the phosphoric acid ester being a phosphoric acid diester having two (meth)acryloyl groups (for example, bis[2-(methacryloyloxy)ethyl] hydrogen phosphate). The phosphoric acid ester may be one formed of any one of a phosphoric acid monoester having one (meth)acryloyl group and a phosphoric acid diester having two (meth)acryloyl groups, or may be formed of both thereof.

The following ratio between the phosphoric acid monoester having one (meth)acryloyl group and a phosphoric acid diester having two (meth)acryloyl groups which form a phosphoric acid ester is preferred to improve the solubility in a radically polymerizable monomer and suppress aggregation of bismuth components. Specifically, it is preferable that 1 mol of a phosphoric acid ester derived from phosphoric acid monoester having one (meth)acryloyl group and 0.05 to 3 mol of a phosphoric acid ester derived from phosphoric acid diester having two (meth)acryloyl groups be included. The content of the phosphoric acid ester derived from phosphoric acid diester is more preferably 0.1 to 2 mol, and still more preferably 0.15 to 1 mol. An advantage of including both of one having one (meth)acryloyl group and one having two (meth)acryloyl groups is presumed that one (meth)acryloyl group (one having a divalent phosphate group) and one having two (meth)acryloyl groups (one having a monovalent phosphate group) have suitable sites to which bismuth is bonded, and the suitable bonding sites are present at a ratio of 0.05 to 3 mol of a phosphoric acid ester derived from one having two (meth)acryloyl groups relative to 1 mol of a phosphoric acid ester derived from one having one (meth)acryloyl group. Further, the presence of one having two (meth)acryloyl groups at the ratio improves the solubility in a radically polymerizable monomer, while the bismuth concentration decreases. As a result, bismuth components at high concentration may be advantageously present in a well-balanced manner.

As long as the phosphoric acid ester is bonded, the phosphoric acid ester-bonded bismuth compound may have another compound bonded. Specifically, salicylic acid and/or (meth)acrylic acid may be further bonded. In the case where a phosphoric acid ester and salicylic acid and/or (meth)acrylic acid are bonded to the same bismuth, in order to improve the solubility in a radically polymerizable monomer, the ratio between phosphoric acid ester and salicylic acid and/or (meth)acrylic acid is preferably 0.1 to 10 mol of salicylic acid and/or (meth)acrylic acid relative to 1 mol of phosphoric acid ester, more preferably 0.1 to 5 mol, still more preferably 0.1 to 1 mol, and particularly preferably 0.1 to 0.5 mol. Incidentally, in the case where two or more phosphoric acid esters are present, the range is based on the total number of moles of the phosphoric acid esters.

The phosphoric acid ester-bonded bismuth compound is a compound in which a phosphoric acid ester having a (meth)acryloyl group is bonded to bismuth, and bonding of the phosphoric acid ester having a (meth)acryloyl group may be checked by the production method thereof, or IR, NMR (nuclear magnetic resonance spectroscopy), MALDI-TOF-MS (matrix-assisted laser desorption/ionization-time-of-flight mass spectrometry), elemental analysis using an energy-dispersed X-ray spectrometer (EDS), etc. Further, the number of bonds of the phosphoric acid ester, salicylic acid and (meth)acrylic acid is known by these methods.

Preferred examples of the phosphoric acid ester-bonded bismuth compound include ones represented by the following formulas (3) to (5).

(3)

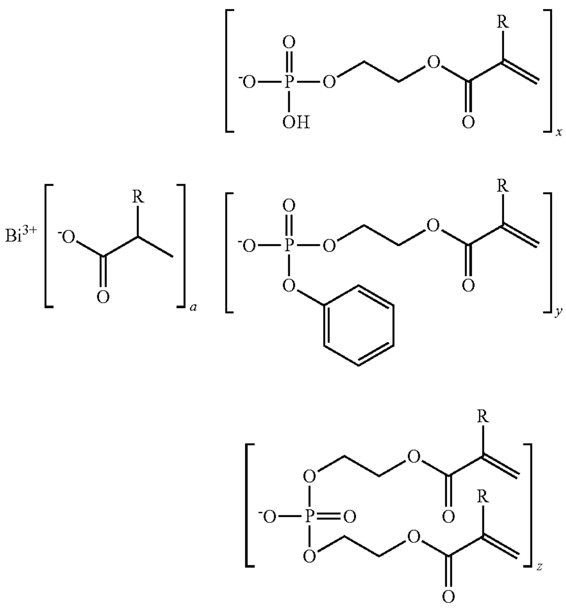

-continued (4)

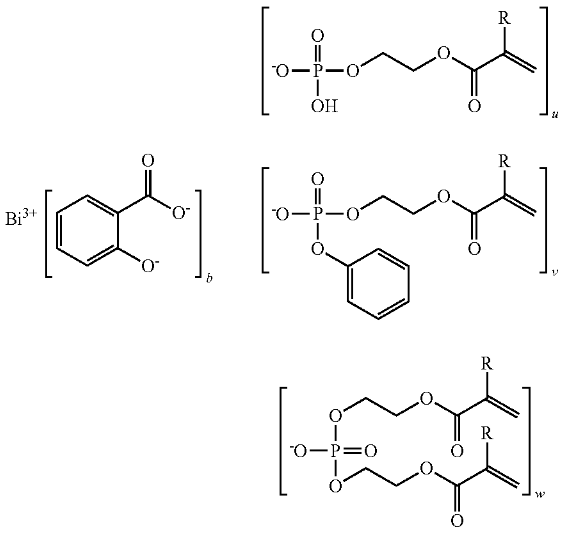

(5)

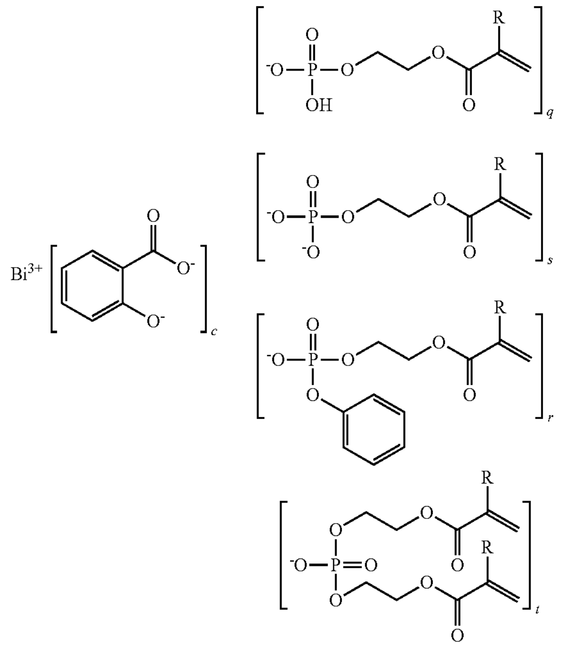

In the formula, R each independently represent a hydrogen atom or a methyl group. Further, in the formula (3), a+x+y+z=3, wherein x represents the number of moles of 2-((meth)acryloyloxy)ethyl hydrogen phosphate residue, y represents the number of moles of phenyl 2-((meth)acryloyloxy)ethyl phosphate residue, z represents the number of moles of bis[2-((meth)acryloyloxy)ethyl] phosphate residue, and a represents the number of moles of (meth)acrylic acid residue. In the formula (4), 2b+u+v+w=3, wherein u represents the number of moles of 2-((meth)acryloyloxy)ethyl hydrogen phosphate residue, v represents the number of moles of phenyl 2-((meth)acryloyloxy)ethyl phosphate residue, w represents the number of moles of bis[2-((meth)acryloyloxy)ethyl] phosphate residue, and b represents the number of moles of salicylic acid residue. In the formula (5), 2c+q+r+2s+t=3, wherein q represents the number of moles of 2-((meth)acryloyloxy)ethyl hydrogen phosphate residue, r represents the number of moles of phenyl 2-((meth) acryloyloxy)ethyl phosphate residue, s represents the number of moles of 2-((meth)acryloyloxy)ethyl phosphate residue, t represents the number of moles of bis[2-((meth) acryloyloxy)ethyl] phosphate residue and c represents the number of moles of salicylic acid residue.

The phosphoric acid ester-bonded bismuth compound represented by the formulas (3) to (5) may not be single compounds, respectively, and may be a mixture of a plurality of compounds. In that case, the number of moles of the respective residues described above represents the number of moles of the whole of the mixture.

For producing a less-colored phosphoric acid ester-bonded bismuth compound at low temperature, in the case of a=0 in the formula (3), x:y:z=1:0.05 to 3:0.5 to 30 is preferred, x:y:z=1:0.1 to 2:1 to 20 is more preferred, and x:y:z=1:0.15 to 1:1.5 to 10 is still more preferred. From the viewpoint of further reducing coloring, a=0 and y=0 may be satisfied.

In the case of other than a=0 in the formula (3), a:(x+y+z)=0.1 to 10:1 is preferred, a:(x+y+z)=0.1 to 5:1 is more preferred, a:(x+y+z)=0.1 to 1:1 is still more preferred, and a:(x+y+z)=0.1 to 5:1 is particularly preferred. And even in this case, x:y:z=1:0.05 to 3:0.5 to 30 is preferred, x:y:z=1:0.1 to 2:1 to 20 is more preferred, and x:y:z=1:0.15 to 1:1.5 to 10 is still more preferred.

In the formula (4), in the case of b=0, x shall be read as u, y as v, and z as w in the prescription.

Further, in the formula (4), in the case of other than b=0, b:(u+v+w)=1:0.1 to 30 is preferred, b:(u+v+w)=1:0.2 to 20 is more preferred, b:(u+v+w)=1:0.3 to 10 is still more preferred, and b:(u+v+w)=1:0.5 to 5 is particularly preferred. In this case, u:v:w=1:20 to 0.05:40 to 0.1 is preferred, u:v:w=1:10 to 0.1:20 to 0.2 is more preferred, and u:v:w=1:5 to 0.2:10 to 0.4 is still more preferred.

In particular, it is preferable that a compound in which phenyl 2-(methacryloyloxy)ethyl hydrogen phosphate is bonded to bismuth subsalicylate be included.

In the formula (5), in the case of c=0, q:r:s:t=1:0.1 to 50:0.05 to 20:0.1 to 40 is preferred, q:r:s:t=1:0.3 to 30:0.1 to 10:0.2 to 20 is more preferred, and q:r:s:t=1:0.5 to 20:0.2 to 5:0.4 to 10 is still more preferred.

In the case of other than c=0 in the formula (5), c:(q+r+s+t)=1:0.1 to 30 is preferred, c:(q+r+s+t)=1:0.2 to 20 is more preferred, c:(q+r+s+t)=1:0.3 to 10 is still more preferred, and c:(q+r+s+t)=1:0.5 to 5 is particularly preferred. Even in that case, q:r:s:t=1:0.1 to 50:0.05 to 20:0.1 to 40 is preferred, q:r:s:t=1:0.3 to 30:0.1 to 10:0.2 to 20 is more preferred, and q:r:s:t=1:0.5 to 20:0.2 to 5:0.4 to 10 is still more preferred.

The content of the phosphoric acid ester-bonded bismuth compound relative to the total amount of the curable composition in the present embodiment is, for example, preferably 5 to 95 mass %, more preferably 10 to 90 mass %, and still more preferably 15 to 85 mass %.

The curable composition in the present embodiment may contain a phosphoric acid compound by-produced during production of the phosphoric acid ester-bonded bismuth compound and an unreacted raw material other than the phosphoric acid ester-bonded bismuth compound.

Examples of the phosphoric acid compound by-produced during production include a dimer of phosphoric acid monoester having one (meth)acryloyl group, a dimer of phosphoric acid diester having two (meth)acryloyl groups, and an ester of bismuth salicylate or bismuth (meth)acrylate and phosphoric acid.

Examples of the unreacted raw material include a phosphoric acid monoester having one (meth)acryloyl group, a phosphoric acid diester having two (meth)acryloyl groups, bismuth salicylate, and bismuth (meth)acrylate.

Since removal of the phosphoric acid compound by-produced during production of the phosphoric acid ester-bonded bismuth compound and the unreacted raw material requires large industrial effort, and the by-produced phosphoric acid compound and the unreacted raw material contribute improvement in solubility into the radically polymerizable monomer, it is preferable that the curable composition in the present embodiment contain the by-produced phosphoric acid compound and the unreacted raw material.

Further, the curable composition in the present embodiment may contain, for example, a compound in which a phosphoric acid ester having a (meth)acryloyl group, (meth) acrylic acid, and/or salicylic acid is bonded to bismuth oxide (hereinafter, referred to also as "compound derived from bismuth oxide"). Although the structure of the compound derived from bismuth oxide is not known, it is presumed that a hydroxy group formed on the surface of bismuth oxide and a carboxy group of phosphoric acid ester, (meth)acrylic acid, or salicylic acid are bonded. It is to be noted that separation of the compound derived from bismuth oxide from the phosphoric acid ester-bonded bismuth compound is very difficult. Accordingly, in the case where the compound derived from bismuth oxide is by-produced, it is preferable that use in a state where the compound derived from bismuth oxide is included is preferred. In the case where a compound derived from bismuth oxide is by-produced, it is preferable that the production conditions be adjusted such that the amount thereof is controlled to a range without causing drop of solubility of the phosphoric acid ester-bonded bismuth compound. Inclusion of the compound derived from bismuth oxide may be comprehensively checked by the production conditions or a method such as IR, NMR, and X-ray photoelectron spectroscopy (XPS).

[Method for Producing Phosphoric Acid Ester-Bonded Bismuth Compound]

It is preferable that the phosphoric acid ester-bonded bismuth compound be produced, for example, by reacting bismuth (meth)acrylate or bismuth subsalicylate with a phosphoric acid ester having a (meth)acryloyl group. More specifically, it is preferable that the phosphoric acid ester-bonded bismuth compound be produced by reacting bismuth (meth)acrylate or bismuth subsalicylate with a phosphoric acid ester having a (meth)acryloyl group in an aliphatic hydrocarbon solvent or an aromatic solvent, to which a polymerization inhibitor is added on an as needed basis, and then dewatering.

(Bismuth (meth)acrylate and bismuth subsalicylate)Bismuth (meth)acrylate is a compound in which salicylic acid is bonded to bismuth. Bismuth subsalicylate is a compound in which salicylic acid is bonded to bismuth, and is represented by the following formula (6).

(6)

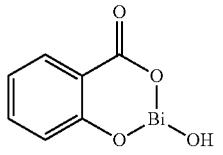

Bismuth (meth)acrylate and bismuth subsalicylate may be produced by a known method without particular limitation, and alternatively, a commercial product may be used.

(Phosphoric Acid Ester Having (Meth)Acryloyl Group)

As phosphoric acid ester having (meth)acryloyl group, a commercial product may be used. The phosphoric acid ester may be a phosphoric acid ester having one (meth)acryloyl group (hereinafter referred to also as "monofunctional phosphoric acid ester"), or may be a phosphoric acid ester having two (meth)acryloyl groups (hereinafter referred to also as "bifunctional phosphoric acid ester"). Examples of the monofunctional phosphoric acid ester include 2-(methacryloyloxy)ethyl dihydrogen phosphate and diphenyl-2-methacryloyloxyethyl phosphate. Examples of the bifunctional phosphoric acid ester include bis[2-(methacryloyloxy)ethyl] hydrogen phosphate and [2-(methacryloyloxy)ethyl] phenyl hydrogen phosphate. Of course, a mixture of monofunctional phosphoric acid ester and bifunctional phosphoric acid ester may be used in the reaction.

The amount of phosphoric acid ester used may be determined, such that a desired phosphoric acid ester-bonded bismuth compound is obtained. Specifically, it is preferable that the amount of phosphoric acid ester be set to a range of 0.3 to 10 mol relative to 1 mole of bismuth (meth)acrylate and bismuth subsalicylate in total.

In the present embodiment, in order to further improve the compatibility, as a phosphoric acid ester having a (meth) acryloyl group, a phosphoric acid triester such as diphenyl-2-methacryloyl oxyethyl phosphate, phenyl bis[2-(methacryloyl oxyethyl)]phosphate, and tris[2-(methacryloyl oxyethyl)]phosphate may be further added.

In particular, use of a phosphoric acid triester having a phenyl group such as diphenyl-2-methacryloly oxyethyl phosphate, phenyl bis[2-(methacryloyl oxyethyl)]phosphate allows a monovalent phenyl phosphoric acid diester having one (meth)acryloyl group in the formulas (3) to (5) to be suitably introduced.

The amount of phosphoric acid triester used relative to 1 mol of a phosphoric acid ester having one (meth)acryloyl group and a phosphoric acid ester having two (meth)acryloyl groups in total is preferably 0.1 to 20 mol, more preferably 0.2 to 5 mol.

(Aliphatic Hydrocarbon Solvent and Aromatic Solvent)

In the present embodiment, it is preferable that bismuth (meth)acrylate or bismuth subsalicylate and a phosphoric acid ester be stirred and mixed in an aliphatic hydrocarbon solvent or an aromatic solvent to cause a reaction. In that occasion, since water is generated in the reaction system, it is preferable that the generated water be removed. In order to easily remove the generated water, it is preferable that an aliphatic hydrocarbon solvent or an aromatic solvent having a high boiling point, specifically 100° C. or more, be used. An aliphatic hydrocarbon solvent and an aromatic solvent may be mixed to be used as a mixture solution.

Examples of the aliphatic hydrocarbon solvent or aromatic solvent include hexane, heptane, nonane, decane, undecane, dodecane, xylene, dimethoxybenzene, benzene, toluene, chlorobenzene, bromobenzene, anisole, petroleum ether, petroleum benzene, and benzoin.

The amount of the aliphatic hydrocarbon solvent or aromatic solvent used is not particularly limited as long as the amount allows bismuth (meth)acrylate or bismuth subsalicylate and a phosphoric acid ester to be sufficiently mixed. In particular, considering the productivity of the phosphoric acid ester-bonded bismuth compound, use of 5 to 100 mL of the aliphatic hydrocarbon solvent and aromatic solvent in total relative to 1 g of bismuth (meth)acrylate and bismuth subsalicylate in total is preferred.

(Reaction Condition)

In the present embodiment, the method for introducing bismuth (meth)acrylate or bismuth subsalicylate and a phosphoric acid ester into a reaction system is not particularly limited. For example, a method including adding bismuth subsalicylate diluted with an aliphatic hydrocarbon solvent or aromatic solvent on an as needed basis and a phosphoric acid ester diluted with an aliphatic hydrocarbon solvent or aromatic solvent on an as needed basis together into a reaction system to be stirred and mixed may be employed. Alternatively, a method including introducing an aliphatic hydrocarbon solvent or aromatic solvent into a reaction system in advance, and adding bismuth subsalicylate diluted with an aliphatic hydrocarbon solvent or aromatic solvent on an as needed basis and a phosphoric acid ester diluted with an aliphatic hydrocarbon solvent or aromatic solvent on an as needed basis together thereto to be stirred and mixed may be employed. Alternatively, a method including introducing one component into a reaction system in advance, and then introducing another component into the reaction system to be stirred and mixed may be employed. In particular, in order to reduce coloring of the resulting phosphoric acid ester-bonded bismuth compound and improve the productivity, it is preferable that the following method be employed. First, bismuth subsalicylate is dispersed in an aliphatic hydrocarbon solvent or aromatic solvent. On this occasion, bismuth subsalicylate may not be dissolved. In that case, it is preferable that agglomerates of bismuth subsalicylate be pulverized by an ultrasonic device or the like, such that none of the agglomerates is present. Then, a phosphoric acid ester is added to the cloudy solution including bismuth subsalicylate dispersed, and stirring and heating are initiated.

Although the temperature during stirring each of the components (reaction temperature) may be the reflux temperature of the aliphatic hydrocarbon solvent or aromatic solvent, in order to reduce coloring of the resulting phosphoric acid ester-bonded bismuth compound, stirring is performed at an oil bath temperature of preferably at 30 to 150° C., more preferably 40 to 140° C., and still more preferably 45 to 120° C.

In the case of a reaction temperature of 30 to 110° C., in order to remove water generated in the reaction system (dewatering), it is preferable to reduce pressure in the reaction system. On this occasion, dewatering may be performed while mixing bismuth subsalicylate and phosphoric acid ester, or may be performed after mixing both. However, considering optimization of the reaction, it is preferable that after mixing both, dewatering be performed while proceeding the reaction.

The reaction time is not particularly limited and may be usually 1 to 6 hours.

The atmosphere under which the reaction is performed may be any one of air atmosphere, inert gas atmosphere and dry air atmosphere considering operability, and it is preferable that the reaction is performed under air atmosphere considering operability.

After reaction under the conditions, in the case where the resulting phosphoric acid ester-bonded bismuth compound has an insoluble turbid component after condensation through distillation of the solvent, it is preferable that the component be separated by filtration or centrifugation. Further, to the condensed reaction solution produced by the treatment, a solvent which is soluble in the reaction solvent used and does not dissolve the phosphoric acid ester-bonded bismuth compound is added to cause reprecipitation for refinement. In the case where a high-boiling point solvent remains, the decantation is repeated to substitute the solvent.

Then, the remaining solvent is distilled away and the phosphoric acid ester-bonded bismuth compound is extracted by vacuum drying.

<Nitrile Compound>

The nitrile compound is not particularly limited as long as it is a compound having a radically polymerizable carbon-carbon double bond and a nitrile group. Examples of the nitrile compound include acrylonitrile, methacrylonitrile, crotononitrile, 2-chloroacrylonitrile, acrylic acid-2-cyanoethyl, allyl cyanide, allyl cyanoacetate, fumaronitrile, and 5-norbornene-2-carbonitrile. In particular, acrylonitrile and methacrylonitrile are preferred, and methacrylonitrile is more preferred.

Considering the X-ray shielding effect, dispersibility, coloring reduction effect, etc., the content of the nitrile compound relative to 100 parts by mass of the phosphoric acid ester-bonded bismuth compound is preferably 1 to 1000 parts by mass, more preferably 2 to 500 parts by mass, and still more preferably 5 to 100 parts by mass.

<Other Radically Polymerizable Monomer>

In order to improve the mechanical properties, color tone, weather resistance, optical uniformity, mold releasability, etc., it is preferable that the curable composition in the present embodiment contain a compound having one radically polymerizable carbon-carbon double bond and being different from the phosphoric acid ester-bonded bismuth compound and the nitrile compound (hereinafter, referred to also as "monofunctional radically polymerizable monomer"). One type of the monofunctional radically polymerizable monomer may be used alone, or two or more types may be used in combination.

Examples of the monofunctional radically polymerizable monomer include various commercially available monofunctional radically polymerizable monomers such as a (meth)acrylic derivative such as acrylic acid, methacrylic acid, methyl acrylate, methyl methacrylate, vinylpyridine, vinylpyrrolidone, phenyl methacrylate, benzyl methacrylate, and 2-phenoxyethyl methacrylate; styrene, methylstyrene and structural isomers thereof; methoxystyrene and structural isomers thereof; styrene derivatives such as chlorostyrene and bromostyrene; and vinyl compounds.

Considering the solubility to the phosphoric acid ester-bonded bismuth compound, viscosity after mixing, and the impact resistance, hardness, thermal properties, etc. of the cured product after curing, the content of the monofunctional radically polymerizable monomer relative to 100 parts by mass of the nitrile compound is preferably 0.2 to 500 parts by mass, more preferably 0.5 to 400 parts by mass, and still more preferably 1 to 300 parts by mass.

In order to further improve the mechanical properties of the cured product after curing such as impact resistance, it is preferable that the curable composition in the present embodiment further contain a compound having two or more radically polymerizable carbon-carbon double bonds (hereinafter, referred to also as "polyfunctional radically polymerizable monomer". One type of polyfunctional radically polymerizable monomer may be used alone, or two or more types may be used in combination.

A commercially available polyfunctional radically polymerizable monomer may be used without limitation. In particular, considering the dissolubility to the phosphoric acid ester-bonded bismuth compound, viscosity after mixing, impact resistance of the cured product after curing, one represented by the following formula (1) or (2) is suitably used.

(1)

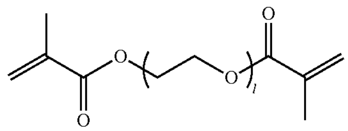

In the formula, 1 represents an integer of 7 to 14.

(2)

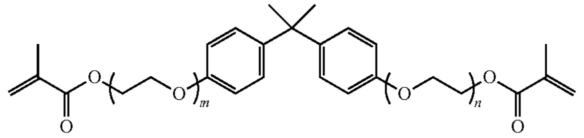

In the formula, n and m each independently represent an integer of 1 to 15, and n+m=2 to 30.

Further, considering improvement in properties such as surface hardness of the cured product, it is preferable that a compound represented by the following formula (7) be used in addition to the compound represented by the formula (1) or (2).

(7)

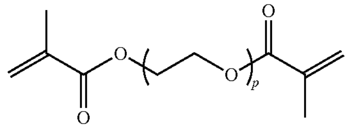

In the formula, p represents an integer of 1 to 5.

Considering the dissolubility to the phosphoric acid ester-bonded bismuth compound, viscosity after mixing, and the impact resistance, hardness and thermal properties of the cured product after curing, the content of the polyfunctional radically polymerizable monomer relative to 100 parts by mass of the nitrile compound is preferably 10 to 500 parts by mass, more preferably 15 to 300 parts by mass, and still more preferably 20 to 250 parts by mass.

<Photochromic Compound>

The curable composition in the present embodiment may contain a photochromic compound for imparting photochromic properties to the resulting cured product. A plurality of types of the photochromic compounds may be appropriately mixed for use to produce an intended color tone.

As the photochromic compound, a known photochromic compound such as a fulgimide compound, spirooxazine compound, and chromene compound may be used without any limitation. Among them, a chromene-based photochromic compound may be particularly suitably used due to higher durability of photochromic properties than other photochromic compounds, and more excellent color density and color fading rate as photochromic properties than the other photochromic compounds.

Examples of the chromene-based photochromic compound include the following compounds other than the compounds used in Examples, though not limited thereto.

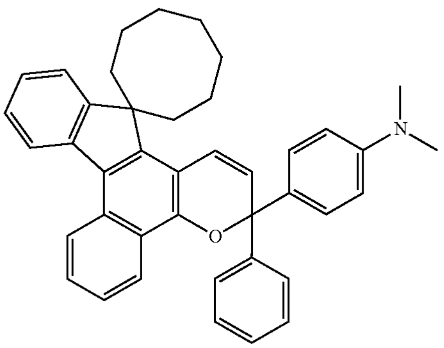

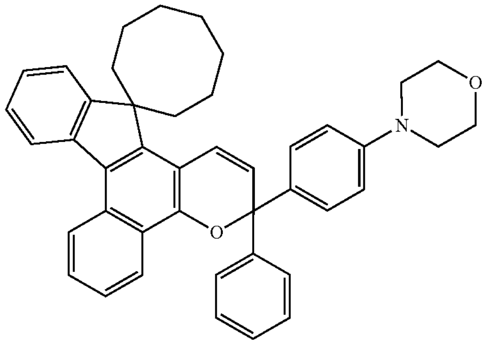

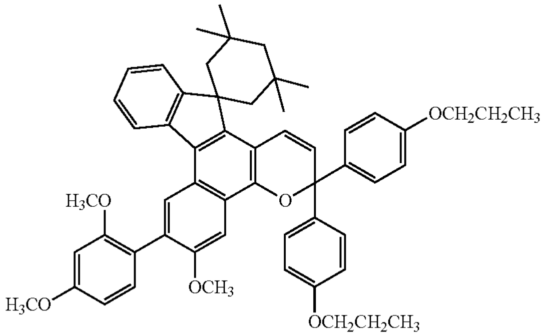

In the case where the curable composition in the present embodiment contains a photochromic compound, the content thereof relative to 100 parts by mass of the curable composition is preferably 0.005 to 20 parts by mass, more preferably 0.01 to 15 parts by mass, and still more preferably 0.02 to 10 parts by mass. With the content controlled to the range, the photochromic compound is uniformly dissolved in the curable composition easily while achieving a sufficient color density, so that the sufficient and uniform color density is also achieved easily.

<Other Compounding Agent>

The curable composition in the present embodiment may contain a known compounding agent other than the above as long as the effect of the present invention is not impaired. Examples of the compounding agent include a radical polymerization initiator, an antioxidant, a stabilizer, a mold release agent for improving the mold releasability property, a dye for adjusting the color tone of the cured product, and a chain transfer agent for controlling polymerizability.

The content of each of the compounding agents relative to 100 parts by mass of the curable composition is preferably 0 to 30 parts by mass, more preferably 0.01 to 20 parts by mass, and still more preferably 0.02 to 15 parts by mass.

The curable composition in the present embodiment may be produced by mixing each of the components described above by a known method.

<<Photochromic Curable Composition>>

The photochromic curable composition in the present embodiment contains a photochromic compound and a curable compound.

<Photochromic Compound>

As the photochromic compound, in the same manner as in the case of the curable composition in the present embodiment, a known photochromic compound such as a fulgimide compound, spirooxazine compound, and chromene compound may be used without any limitation.

Considering the photochromic properties such as color density and color fading rate of the resulting cured product, the content of the photochromic compound relative to 100 parts by mass of the photochromic curable composition other than the photochromic compound is preferably 0.1 to 20 parts by mass. In particular, for exhibition of more excellent photochromic properties, the content relative to 100 parts by mass of the photochromic curable composition other than the photochromic compound is more preferably 2 to 10 parts by mass.

<Curable Compound>

As the curable compound, a known curable compound may be used. Specific examples of the curable compound include trimethylol propane trimethacrylate, trimethylol propane triacrylate, tetramethylol methane trimethacrylate, tetramethylol methane triacrylate, tetramethylol methane tetramethacrylate, tetramethylol methane tetraacrylate, trimethylol propane triethylene glycol trimethacrylate, trimethylol propane triethylene glycol triacrylate, ditrimethylol propane tetramethacrylate, ditrimethylol propane tetraacrylate, dipentaerythritol hexaacrylate, bisphenol A dimethacrylate, 2,2-bis(4-methacryloyl oxyethoxy phenyl)propane, 2,2-bis(4-methacryloyl oxypolyethylene glycol phenyl)propane having an average molecular weight of 776, 2,2-bis(4-methacryloyl oxypolyethylene glycol phenyl)propane having an average molecular weight of 804, 2,2-bis(4-acryloyl oxypolyethylene glycol phenyl)propane having an average molecular weight of 776, methoxy polyethylene glycol methacrylate having an average molecular weight of 468, diethylene glycol dimethacrylate, triethylene glycol dimethacrylate, tetraethylene glycol dimethacrylate, pentaethylene glycol dimethacrylate, pentapropylene glycol dimethacrylate, diethylene glycol diacrylate, triethylene glycol diacrylate, tetraethylene glycol diacrylate, pentaethylene glycol diacrylate, tripropylene glycol diacrylate, tetrapropylene glycol diacrylate, pentapropylene glycol diacrylate, polyethylene glycol dimethacrylate having an average molecular weight of 330, polyethylene glycol dimethacrylate having an average molecular weight of 536, polytetramethylene glycol dimethacrylate having an average molecular weight of 736, tripropylene glycol dimethacrylate, tetrapropylene glycol dimethacrylate, polypropylene glycol dimethacrylate having an average molecular weight of 536, polyethylene glycol diacrylate having an average molecular weight of 258, polyethylene glycol diacrylate having an average molecular weight of 308, polyethylene glycol diacrylate having an average molecular weight of 532, polyethylene glycol diacrylate having an average molecular weight of 708, polycarbonate di(meth)acrylate as a reaction product of polycarbonate diol and (meth)acrylic acid, polyfunctional urethane (meth)acrylate (urethane oligomer tetraacrylate, urethane oligomer hexamethacrylate, urethane oligomer hexaacrylate, etc.), polyfunctional polyester(meth) acrylate (polyester oligomer hexaacrylate, etc.), a silsesquioxane monomer having a (meth)acryloyl group with various structures such as a cage-like, ladder-like, or random-like structure, glycidyl acrylate, glycidyl methacrylate, β-methyl glycidyl methacrylate, bisphenol A-monoglycidyl ether-methacrylate, 4-glycidyloxy methacrylate, 3-(glycidyl-2-oxyethoxy)-2-hydroxypropyl methacrylate, 3-(glycidyloxy-1-isopropyloxy)-2-hydroxypropyl acrylate, 3-glycidyloxy-2-hydroxy propyloxy)-2-hydroxypropyl acrylate, glycidyloxy polyethylene glycol methacrylate having an average molecular weight of 540 (main components having a molecular weight in the range of 390 to 660), γ-methacryloyloxy propyltrimethoxysilane, γ-methacryloyloxy propyltriethoxysilane, γ-methacryloyloxy propylmethyl dimethoxysilane, (3-acryloyloxypropyl)dimethylmethoxysilane, (3-acryloyloxypropyl)methyldimethoxysilane, (3-acryloyloxypropyl) trimethoxysilane, 3-(N-allylamino)propyltrimethoxysilane, allyl dimethoxysilane, allyl triethoxysilane, allyl trimethoxysilane, 3-aminophenoxy dimethyl vinylsilane, 4-aminophenoxy dimethyl vinylsilane, 3-(3-aminopropoxy)-3,3-dimethyl-1-propenyltrimethoxysilane, butenyl triethoxysilane, 2-(chloromethyl)allyl trimethoxysilane, diethoxy vinylsilane, 1,3-divinyltetra ethoxydisiloxane, docosenyl triethoxysilane, O-(methacryloxy ethyl)-N-(triethoxysilyl propyl) urethane, N-(3-methacryloxy-2-hydroxypropyl)-3-aminopropyl triethoxysilane, methacryloyloxy ethoxy trimethylsilane, (methacryloxy methyl)dimethyl ethoxysilane, methacryloyloxy methyltriethoxysilane, methacryloyloxy methyltrimethoxysilane, methacryloyloxy propyldimethyl ethoxysilane, methacryloyloxy propyldimethyl methoxysilane, methacryloyloxy propyltris(methoxy ethoxy) silane, 7-octenyl trimethoxysilane, 1,3-bis(methacryloxy)-2-trimethylsiloxy propane, tetrakiε(2-methacryloyloxy ethoxy)silane, trivinyl ethoxysilane, trivinyl methoxysilane, vinyldimethyl ethoxysilane, vinyldiphenyl ethoxysilane, vinylmethyl diacetoxysilane, vinylmethyl diethoxysilane, vinylmethyl dimethoxysilane, O-(vinyloxyethyl)-N-(triethoxy silylpropyl)urethane, vinyloxy trimethylsilane, vinylphenyl diethoxysilane, vinylphenyl methylmethoxysilane, vinyltriacetoxysilane, vinyltri-t-butoxysilane, vinyltriethoxysilane, vinyltriisopropenoxysilane, vinyltriisopropoxysilane, vinyltrimethoxysilane, vinyltriphenoxysilane, vinyltris(2-methoxyethoxy)silane, 2-isocyanato ethoxymethacrylate, and 4-(2-isocyanatoisopropyl)styrene.

<Other Compounding Agent>

The photochromic curable composition in the present embodiment may contain a known compounding agent other than the above, as long as the effect of the present invention is not impaired. Examples of the compounding agent include a radical polymerization initiator, an antioxidant, a stabilizer, a mold release agent for improving the mold releasability, a dye for adjusting the color tone of the cured product, and a chain transfer agent for controlling the polymerizability.

The content of each of the compounding agents relative to 100 parts by mass of the photochromic curable composition is preferably 0 to 30 parts by mass, more preferably 0.01 to 20 parts by mass, and still more preferably 0.02 to 15 parts by mass.

The photochromic curable composition in the present embodiment may be produced by mixing each of the components according to the conventional method.

<<Cured Product and Multilayer Body>>

The cured product in the present embodiment is obtained by curing the curable composition in the present embodiment. The multilayer body in the present embodiment is produced by stacking the cured product and a cured product obtained by curing the photochromic curable composition in the present embodiment.

The method for producing the cured product is not particularly limited, and a known polymerization method such as photopolymerization and thermal polymerization may be employed. Suitable polymerization method is determined depending on the radical polymerization initiator added to the curable composition on an as needed basis, and the like.

The method for producing the multilayer body is also not particularly limited, and a method including preparing a cured product by curing the curable composition in the present embodiment, then applying the photochromic curable composition in the present embodiment to the surface of the cured product by spin coating or dipping, and then curing the coating by UV radiation or heating is suitable. In this case, another layer may be disposed between the cured product formed by curing the curable composition in the present embodiment and the cured product formed by curing the photochromic curable composition in the present embodiment, or the multilayer body may be further provided with another layer.

[Physical Property of Cured Product and Multilayer Body]

The cured product and the multilayer body in the present embodiment may have high transparency with less coloring while containing bismuth having high X-ray shielding ability at a high content. The cured product in the present embodiment having, for example, a thickness of 2 mm, may have a transmittance of 80% or more at a wavelength of 560 nm, an X-ray shielding ability equivalent to 0.02 mm or more of lead foil, and a yellowness of 45 or less. Further, the cured product in the present embodiment may have a content of bismuth component in the cured product relative to the total mass of the cured product of 5 to 40 mass %.

[Photochromic Property of Cured Product and Multilayer Body]

In the case of using a photochromic compound, examples of the indexes of the photochromic properties include (1) color tone relating to the maximum absorption wavelength (Amax) which is the wavelength at which the largest optical absorption occurs before and after coloring, and the absorption spectrum, (2) color density {ε(120)−ε(0)} which is the difference between the absorbance {ε(120)} after light irradiation at the maximum absorption wavelength for 120 seconds and the absorbance {ε(0)} before light irradiation, and (3) color fading rate [t½ (sec.)] which is the time required for the absorbance of the sample at the maximum absorption wavelength to decrease to ½ of {ε(120)−ε(0)}, when the light irradiation is stopped after the light irradiation for 120 seconds.

The maximum absorption wavelength and color tone described in the above (1) may be appropriately adjusted by the type and the amount of the photochromic compound used. The color density described in the above (2) is preferably 0.2 to 1.2, and more preferably 0.3 to 1.1, because the visibility may be drastically lowered by excessively high color density. The color fading rate described in the above (3) may be selected depending on the usage environment or preference, and for example, for eyeglasses, higher color fading rate is preferred.

[Use of Cured Product and Multilayer Body]

Due to use of a bismuth compound instead of lead, the cured product and the multilayer body in the present embodiment are highly safe and has sufficient radiation shielding ability, high transparency as optical materials with reduced coloring, and mechanical properties for practical use. Accordingly, the cured product and the multilayer body in the present embodiment may be suitably used as radiation protective material for lens for X-ray protective eyeglasses for medical applications and the like, shielding material, screen, observation window, etc. Further, in the case of using a photochromic compound, shielding ability for light such as sunlight including UV rays is also achieved, so that outdoor use is particularly suitable.

EXAMPLES

In the following, the present invention is described in detail with reference to Examples and Comparative Examples, though the present invention is not limited to the following Examples.

The analysis method and measurement method in the present Examples are as follows.

<Analysis Method of Phosphoric Acid Ester-Bonded Bismuth Compound>

IR Measurement

A Fourier transform infrared spectrophotometer (Spectrum One manufactured by PerkinElmer, Inc.) was used. Measurement was performed by one reflection ATR method with four times accumulation.

TG/DTA Measurement

A differential thermogravimetric analyzer (TG8120 manufactured by Rigaku Corporation) was used. Scanning was performed under air stream, at a heating rate of 10° C./min from room temperature to 500° C.

Raman Scattering Measurement

A microscopic Raman spectrometer (NRS-7100 manufactured by JASCO Corporation) was used. Using a 532-nm laser, an objective lens with a magnification ratio of 100, a 600-line/mm grating, apertures having a diameter of 25 μm and a diameter of 4000 μm, respectively, for excitement of a sample, measurement was performed at an exposure time of 20 seconds×2.

$^{1}$H-, $^{31}$P-NMR Measurement

A nuclear magnetic resonance apparatus (JNM-ECA400II manufactured by JEOL RESONANCE Inc.) was used. Using deuterated acetone as solvent, measurement was performed at a sample concentration of 1 mass %.

XPS Measurement

An X-ray photoelectron spectrometer (ESCA5701ci/MC manufactured by ULVAC-PHI, Inc.) was used. As X-ray source, monochromatized Al-Kα (14 kV-330 W) was used. The aperture diameter was set to 800 μm, and the photoelectron extraction angle was set to 45°. The sample was pulverized in an agate mortar, and the resulting powder was fixed to a base plate with a carbon tape and introduced into a measurement chamber for measurement.

MALDI-TOF-MS (Matrix Assisted Laser Desorption Ionization/Time-of-Flight Mass Spectroscopy) Measurement A rapiflex TOF/TOF manufactured by Bruker was used. As matrix, CHCA (α-cyano-4-hydroxycinnamic acid), DIT (Dithranol) and DHB (2,5-Dihydroxybenzoic acid) were used, and as cationizing agent, sodium trifluoroacetate was used. The measurement was performed at a Reflector/Positive mode, and the mass range was set to m/z 20 to 4000.

<Viscosity Measurement of Curable Composition>

The viscosity measurement of a curable composition was performed by measuring the dynamic viscosity at 25° C. with a Cannon-Fenske viscometer, and multiplying the density. Alternatively, using an E-type viscometer (Rheometer RST manufactured by Brookfield), measurement was performed at 25° C.

<Measurement of Physical Properties of Cured Product and Multilayer Body>

The curable composition was thermally polymerized to prepare a cured product (plate) having a thickness of 2 mm, which was subjected to measurement of physical properties as follows.

Radiation (X-Ray) Shielding Ability

The X-ray shielding ability of the resulting cured product was evaluated as follows. First, according to JIS T 61331-1 "Protective devices against diagnostic medical X-radiation, Part 1: Determination of attenuation properties of materials", the transit X-ray dose was measured. As X-ray apparatus, MG-45 manufactured by Yxlon International K.K. with an X-ray tube voltage of 120 kV, a tube current of 12.5 mA, and an attached filter plate of 2.5-mm Al was used. With a distance from X-ray tube focus point to sample set to 600 mm, and a distance from sample to measurement apparatus set to 900 mm, an ionization chamber dosimeter (RAMTEC-Solo type A4 probe manufactured by Toyo Medic Co., Ltd.) was used as measurement apparatus. The X-ray shielding ability was evaluated based on the lead equivalent (mmPb) which is the thickness (mm) of an equivalent lead plate.

Impact Resistance

Falling ball test was performed to evaluate the impact resistance of the resulting cured product. On a tube having an inner diameter of 25 mm, an outer diameter of 32 mm, and a height of 25 mm, a support ring made of NBR having a thickness of 3 mm and diameters equal to those of the tube was joined. A steel ball having a weight of 4.5 g, 6.9 g, 14 g, 16 g, 32 g, 50 g, 67 g, 80 g, 95 g, 112 g, 130 g, 151 g, 174 g, 198 g, 225 g, or 261 g was dropped from a height of 1.27 m onto the cured product in a plate form laid on the support ring in order from the lightest one with use of a dropping apparatus having an electromagnet. The weight of the steel ball immediately before the cracks or fractures were caused in the sample was determined as the maximum impact resistance.

Surface Hardness

In measurement of the surface hardness of the cured product, Akashi Rockwell hardness tester AR-10 was used.

Photochromic Property

For color development, a Xenon lamp L-2480 (300 W) SHL-100 manufactured by Hamamatsu Photonics K.K. radiated light through an aeromass filter (manufactured by Corning) at 20° C.±1° C., with a beam intensity at the surface of a cured product or multilayer body of 365 nm=2.4 mW/cm$^2$, 245 nm=24 μW/cm$^2$, for 120 seconds, and the photochromic properties of the cured product or multilayer body were evaluated by the following method.

[1-1] Maximum Absorption Wavelength (λmax):

The maximum absorption wavelength after color development was obtained by a spectrophotometer (instant multichannel photodetector MCPD1000) manufactured by Otsuka Electronics Co., Ltd.). The value relates to the color tone in color development.

[1-2] Color Tone in Color Development

The color was developed outdoors, and the color tone in the color development was visually evaluated.

[2] Color Density {ε(120)−ε(0)}:

The difference between absorbance {ε(120)} after light irradiation for 120 seconds and absorbance {ε(0)} before light irradiation at the maximum absorption wavelength was determined as color density.

[3] Color Fading Rate [t½ (Sec.)]

The time required for the absorbance of the sample at the maximum absorption wavelength to decrease to ½ of {ε(120)−ε(0)}, when the light irradiation was stopped after the light irradiation at the maximum absorption wavelength for 120 seconds was determined as color fading rate.

The production method and abbreviations of the compounds used in Examples are as follows.

(1)Phosphoric Acid Ester-Bonded Bismuth Compound

The phosphoric acid ester-bonded bismuth compound was produced by the following method. In a 1000-mL eggplant-shaped flask, 94.27 g of bismuth (III) subsalicylate (manufactured by Sigma-Aldrich, 260.35 mmol in terms of bismuth), 33.06 g of mixture of bis[(2-methacryloyl oxyethyl)]phosphate and (2-methacryloyl oxyethyl)phosphate (MR-200 manufactured by Daihachi Chemical Industry Co., Ltd., phosphoric acid value: 162.04 mmol), 33.09 g of diphenyl-2-methcryloyl oxyethyl phosphate (MR-260 manufactured by Daihachi Chemical Industry Co., Ltd., 91.33 mmol), and 6.17 g of dibutyl hydroxytoluene as polymerization inhibitor (BHT manufactured by FUJIFILM WAKO Pure Chemical Corporation, special grade chemical) were placed, and 750 mL of toluene was added thereto. The mixture was subjected to ultrasonic dispersion by a bath-type sonicator to produce a cloudy solution.

The resulting cloudy solution was transferred into a 1000-mL four neck flask with a Dean-Stark trap installed, and a reaction was performed while heating and stirring at 130° C. with an oil bath. Water generated was removed outside the system. The time point when the generation of water finished was presumed as reaction end. A pale yellow scatter solution with a small amount of pale yellow precipitation was obtained.

The solution was condensed into 250 mL with a vacuum evaporator. After adding 8 g of alumina powder thereto, the mixture was left still overnight, and subjected to suction filtration with a 5B filter paper. To the resulting pale yellow scatter filtrate, 3 g of activated carbon was (DarcoG60 manufactured by Norit) was added and processed with a centrifugal machine at 23830×g for 8 hours. The centrifugal supernatant was filtered under pressure with a 0.2 μm membrane filter to produce a transparent pale yellow filtrate. From the solution, the solvent was distilled away with a vacuum evaporator, and redissolved in 250 mL of acetone. To the resulting pale yellow solution, 3 g of activated carbon (Norit SX-Plus manufactured by Norit) was added, and the mixture was processed by a centrifugal machine at 23830×g for 12 hours. The centrifugal supernatant was filtered under pressure with a membrane filter having a pore diameter of 0.2 μm to produce a transparent pale yellow filtrate. The resulting filtrate was condensed to 100 mL with a vacuum evaporator. The acetone solution was fed into 800 mL of hexane placed in a 1000 mL conical beaker while stirring. The resulting white precipitate was taken by filtering by suction filtration using filter paper 5B, and the resulting solid was vacuum dried. As white powder, 64.40 g of the phosphoric acid ester-bonded bismuth compound was obtained. Checking of the synthesis was performed by the $^{1}$H-NMR measurement method described above. The structure of the resulting phosphoric acid ester-bonded bismuth compound was a structure having b=u=v=w=0.6 in the formula (4).

(2) Photochromic Compound

PC1

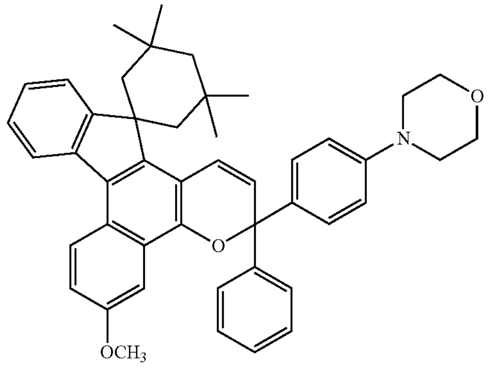

PC2

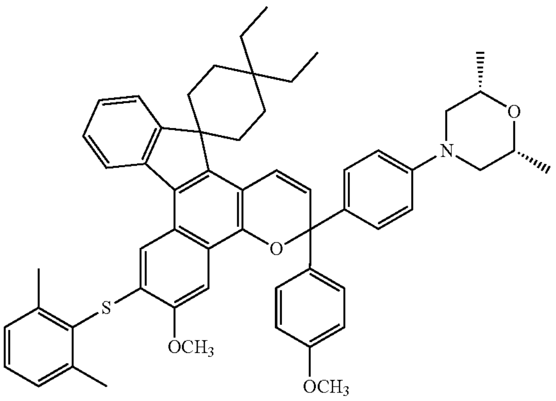

PC3

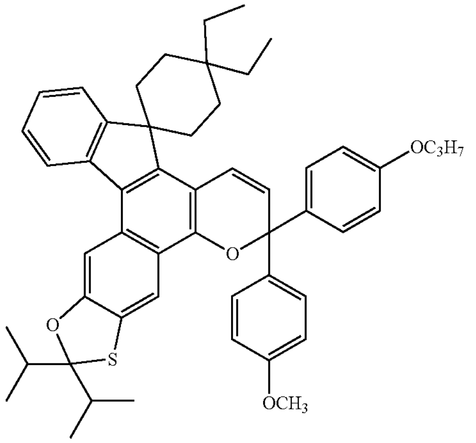

-continued

PC4

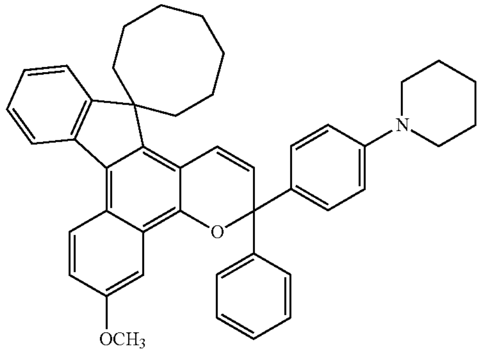

(3) Radically Polymerizable Monomer
(Nitrile Compound)
Acrylonitrile
(Other Radically Polymerizable Monomer)
Styrene
BPE-100: Ethoxylated bisphenol A dimethacrylate (EO 2.6 mol) (manufactured by Shin-Nakamura Chemical Co., Ltd.)
BPE-500: Ethoxylated bisphenol A dimethacrylate (EO 10 mol) (manufactured by Shin-Nakamura Chemical Co., Ltd.)
C6DA: 1,6-Hexanediol dimethacrylate (manufactured by FUJIFILM WAKO Pure Chemical Corporation)
TMPT: Trimethylol propane trimethacrylate (manufactured by Shin-Nakamura Chemical Co., Ltd.)
9G: Nonaethylene glycol dimethacrylate (manufactured by Shin-Nakamura Chemical Co., Ltd.)
M1: 2,2-Bis(4-methacryloyl oxypolyethylene glycol phenyl)propane (average molecular weight: 776)
M2: Polyethylene glycol diacrylate (average molecular weight: 532)
M3: Trimethylol propane trimethacrylate
M4: Polyester oligomer hexaacrylate (EB-1830 manufactured by Dicel-Allnex Ltd.)
M5: Glycidyl methacrylate
M6: γ-Methacryloyloxy propyl trimethoxy silane
(4) Polymerization Initiator
2,2'-Azobis(2,4-dimethyl valeronitrile) (V-65)
IN1: 1-Hydroxycyclohexyl phenyl ketone
IN2: Bis(2,6-trimethoxy benzoyl)-2,4,4-trimethyl pentyl phosphine oxide
(5) Other Compounding Agent (Light Stabilizer)
LS765: Bis(1,2,2,6,6-pentamethyl-4-pyperidyl)sebacate
NMDEA: N-methyl diethanol amine

Example 1

To 70 parts by mass of the phosphoric acid ester-bonded bismuth compound (in tables, described as "bismuth compound"), 15 parts by mass of acrylonitrile and 15 parts by mass of styrene were added to be uniformly dissolved, so that a curable composition was obtained. The curable composition had a viscosity of 80 mPa-s, which allowed bulk polymerization to be suitably performed by casting. To the curable composition, 0.6 parts by mass of 2,2'-azobis(2,4-dimethyl valeronitrile) (V-65) was further added and completely dissolved. Subsequently, the curable composition was placed under reduced pressure using a vacuum pump, so that dissolved oxygen was removed. The curable composition was then injected into a glass mold having a thickness of 2 mm to be polymerized at a maximum temperature of 90° C. for 4 hours, so that a transparent pale yellow cured product was obtained. The resulting cured product had a thickness of 2.38 mm. The results are shown in Table 1.

Comparative Example 1

The same operation was performed as in Example 1, except that 30 parts by mass of styrene were added to 70 parts by mass of phosphoric acid ester-bonded bismuth compound to be uniformly dissolved. The resulting curable composition had a viscosity of 400 mPa-s, which did not allow bulk polymerization to be suitably performed by casting. The resulting cured product was transparent pale yellow. The results are shown in Table 1.

Example 2

The same operation was performed as in Example 1, except that 30 parts by mass of acrylonitrile were added to 70 parts by mass of phosphoric acid ester-bonded bismuth compound to be uniformly dissolved. The resulting curable composition had a viscosity of 45 mPa-s, which allowed bulk polymerization to be suitably performed by casting. The resulting cured product was transparent dark orange. The results are shown in Table 1.

Example 3

The same operation was performed as in Example 1, except that 11 parts by mass of acrylonitrile and 12 parts by mass of styrene were added to 77 parts by mass of phosphoric acid ester-bonded bismuth compound to be uniformly dissolved. The resulting curable composition had a viscosity of 150 mPa-s, which allowed bulk polymerization to be suitably performed by casting, even with a high concentration of bismuth. The resulting cured product was transparent pale yellow. The results are shown in Table 1.

Comparative Example 2

Although 23 parts by mass of styrene was added to 77 parts by mass of phosphoric acid ester-bonded bismuth compound for uniform dissolving, a gel was formed, from which bubbles were not able to be removed, so that viscosity was not able to be measured. Accordingly, no cured product was made.

TABLE 1

| | Bismuth compound (Parts by mass) | Acrylonitrile (Parts by mass) | Styrene (Parts by mass) | Viscosity (mPa · s) | Coloring |
|---|---|---|---|---|---|
| Example 1 | 70 | 15 | 15 | 80 | Transparent pale yellow |

TABLE 1-continued

| | Bismuth compound (Parts by mass) | Acrylonitrile (Parts by mass) | Styrene (Parts by mass) | Viscosity (mPa · s) | Coloring |
|---|---|---|---|---|---|
| Comparative Example 1 | 70 | — | 30 | 400 | Transparent pale yellow |
| Example 2 | 70 | 30 | — | 45 | Transparent dark orange |
| Example 3 | 77 | 11 | 12 | 150 | Transparent pale yellow |
| Comparative Example 2 | 77 | — | 23 | Unmeasurable | — |

As shown in Table 1, while the curable composition containing the phosphoric acid ester-bonded bismuth compound and a nitrile compound had a viscosity which allowed bulk polymerization to be suitably performed by casting, the two-component system including the phosphoric acid ester-bonded bismuth compound and styrene had a viscosity which was insufficiently low.

Examples 4 to 13

The same operation was performed as in Example 1, except that according to the composition shown in Table 2, the phosphoric acid ester-bonded bismuth compound, acrylonitrile, and other radically polymerizable monomer were added to be uniformly dissolved. A drop ball test and Rockwell hardness measurement were performed. The results are shown in Table 2.

TABLE 2

| | Bismuth compound (Parts by mass) | Acrylonitrile (Parts by mass) | Other radically polymerizable monomer (Parts by mass) | Maximum impact resistance (g) | Rockwell hardness |
|---|---|---|---|---|---|
| Example 4 | 70 | 7.5 | Styrene (12.5) BPE-500 (10) | 32 | 98 |
| Example 5 | 70 | 12.5 | Styrene (7.5) BPE-500 (10) | 112 | 96 |
| Example 6 | 70 | 15 | Styrene (5) BPE-500 (10) | 198 | 97 |
| Example 7 | 70 | 5 | Styrene (15) 9G (10) | 32 | 91 |
| Example 8 | 70 | 7.5 | Styrene (12.5) 9G (10) | 50 | 94 |
| Example 9 | 70 | 9 | Styrene (11) 9G (10) | 130 | 95 |
| Example 10 | 70 | 10 | Styrene (10) 9G (10) | 151 | 95 |
| Example 11 | 70 | 11 | Styrene (9) 9G (10) | 261 or more | 98 |
| Example 12 | 70 | 12.5 | Styrene (7.5) 9G (10) | 174 | 103 |
| Example 13 | 70 | 15 | Styrene (5) 9G (10) | 67 | 106 |

Examples 14 to 28

The same operation was performed as in Example 1, except that according to the composition shown in Table 3, the phosphoric acid ester-bonded bismuth compound, methacrylonitrile, and other radically polymerizable monomer were added to be uniformly dissolved, and 0.3 parts by mass of methylstyrene dimer was added for adjustment of polymerization rate. A drop ball test was performed. The results are shown in Table 3.

TABLE 3

| | Bismuth compound (Parts by mass) | Methacrylonitrile (Parts by mass) | Other radically polymerizable monomer (Parts by mass) | Maximum impact resistance (g) |
|---|---|---|---|---|
| Example 14 | 70 | 13 | Styrene (15)<br>9G (10) | 67 |
| Example 15 | 70 | 12 | Methyl methacrylate (5.7)<br>9G (12) | 50 |
| Example 16 | 70 | 15 | Ethyl acrylate (4.7)<br>9G (10) | 80 |
| Example 17 | 70 | 12 | n-Butyl acrylate (5.7)<br>9G (12) | 95 |
| Example 18 | 70 | 12 | Methyl acrylate (5.7)<br>9G (12) | 50 |
| Example 19 | 70 | 12 | Myrcene (5.7)<br>9G (12) | 112 |
| Example 20 | 70 | 12 | 2-Methoxyethyl acrylate (5.7)<br>9G (12) | 151 |
| Example 21 | 70 | 14 | Methoxy triethylene glycol acrylate (3.7)<br>9G (12) | 67 |
| Example 22 | 70 | 12 | Ethylene glycol phenyl ether acrylate (5.7)<br>9G (12) | 50 |
| Example 23 | 70 | 12 | CR-39 (5.7)<br>9G (12) | 67 |
| Example 24 | 70 | 14 | Allyl acetoacetate (3.7)<br>9G (12) | 67 |
| Example 25 | 70 | 14 | 4-Hydroxybutyl vinyl (5.7)<br>9G (10) | 50 |
| Example 26 | 70 | 16 | Allyl cyanoacetate (5.7)<br>9G (8) | 32 |
| Example 27 | 70 | 12 | Hydroxypropyl acrylate (5.7)<br>9G (12) | 50 |
| Example 28 | 70 | 12 | 2-(2-Ethoxyethoxy)ethyl acrylate (5.7)<br>9G (12) | 80 |

As shown in Tables 2 and 3, in Examples 4 to 28, a maximum impact resistance of 30 g or more and a Rockwell hardness of 80 or more were achieved. Due to the high impact resistance and high surface hardness, suitable use as protective eyeglasses was achieved.

The cured product in Examples 1 to 28 were subjected to X-ray shielding test at 120 keV. As a result, the lead equivalent was 0.12±0.04 mmPb.

Example 29: Photochromic Multilayer Body

70 Parts by mass of phosphoric acid ester-bonded bismuth compound, 10 parts by mass of styrene, 10 parts by mass of acrylonitrile, and 10 parts by mass of nonaethylene glycol dimethacrylate (manufactured by Shin-Nakamura Chemical Co., Ltd.) were uniformly dissolved. To the resulting composition, 0.6 parts by mass of 2,2'-azobis(2,4-dimethyl valeronitrile) was added to be completely dissolved, so that a curable composition was produced. Subsequently, the curable composition was placed under reduced pressure using a vacuum pump, so that dissolved oxygen was removed. The curable composition was then injected between two disc-shaped glass molds having a diameter of 7 cm fixed with an adhesive tape to have a void having a thickness of 2 mm, so as to be polymerized at a maximum temperature of 90° C. for 4 hours, so that a transparent pale yellow cured product was obtained. The resulting cured product had a thickness of 2.01 mm.

On the other hand, the photochromic curable composition was prepared as follows. Adjustment was made such that polymerizable compounds had a mass ratio M1:M2:M3:M4:M5:M6=43:15:15:10:10:7. To 100 parts by mass of the polymerizable compounds, 1.2 parts by mass of photochromic compound PC1, 0.4 parts by mass of PC2, 1.2 parts by mass of PC3, 0.375 parts by mass of polymerization initiator IN1, 0.125 parts by mass of polymerization initiator IN2, and as other compounding agents, 5 parts by mass of light stabilizer LS765, and 3 parts by mass of NMDEA were added and sufficiently mixed to produce a photochromic curable composition. The photochromic curable composition had a viscosity of 120 mPa-s measured with an E-type viscometer at 25° C., which allowed spin coating to be suitably performed.

Subsequently, 2 g of the photochromic curable composition produced by the method was applied to the surface of the cured product by spin coating using a spin coater 1H-DX2 manufactured by MIKASA. The spin coating conditions were adjusted such that the photochromic cured product obtained after curing of the photochromic curable composition had a thickness of 40±1 μm. Subsequently, the cured product having a surface spin coated with the photochromic curable composition was subjected to light irradiation under nitrogen gas atmosphere for 90 seconds using F3000SQ with a D bulb manufactured by Fusion UV Systems, Inc. adjusted to have an output of 200 mW/$cm^2$ on the surface of the cured product at a wavelength of 405 nm, so that the photochromic curable composition was cured. Subsequently, heating treatment was performed in an incubator at 100° C. for 1 hour to produce a multilayer body.

The resulting multilayer body had a radiation (X-ray) shielding ability of 0.10±0.04 mmPb as lead equivalent. As the photochromic properties, a maximum absorption wavelength of 588 nm, a color density of 0.9, a color tone of dark brown, and a color fading rate of 62 sec. were obtained.

Example 30: Cured Product Containing Photochromic Compound

70 Parts by mass of phosphoric acid ester-bonded bismuth compound, 9 parts by mass of styrene, 9 parts by mass of acrylonitrile, and 12 parts by mass of nonaethylene glycol dimethacrylate (manufactured by Shin-Nakamura Chemical Co., Ltd.) were added and uniformly dissolved. To 100 parts by mass of the resulting composition, 0.017 parts by mass of photochromic compound PC1, 0.01275 parts by mass of PC2, 0.034 parts by mass of PC3, 0.00425 parts by mass of PC4 were added, and 0.4 parts by mass of 2,2'-azobis (isobutyric acid) was added to be dissolved, so that a curable composition was produced. Subsequently, the curable composition was placed under reduced pressure using a vacuum pump, so that dissolved oxygen was removed. The curable composition was then injected between two disc-shaped glass molds having a diameter of 7 cm fixed with an adhesive tape to have a void having a thickness of 2 mm, so as to be polymerized at a maximum temperature of 90° C. for 4 hours. After releasing from the mold, annealing was performed at 100° C. for 2 hours, so that a transparent pale brown cured product was produced. The resulting cured product had a thickness of 2.03 mm.

The resulting multilayer body had a radiation (X-ray) shielding ability of 0.10±0.04 mmPb as lead equivalent. As the photochromic properties, a maximum absorption wavelength of 598 nm, a color density of 0.45, a color tone of dark brown, and a color fading rate of 74 sec. were obtained

The invention claimed is:

1. A curable composition, comprising: a bismuth compound in which a phosphoric acid ester having a (meth) acryloyl group is bonded to bismuth; and a nitrile compound having a radically polymerizable carbon-carbon double bond, wherein the content of the phosphoric acid ester bonded bismuth compound relative to a total amount of the curable composition is 15 to 85 mass %; and wherein the content of the nitrile compound relative to 100 parts by mass of the phosphoric acid ester bonded bismuth compound is 5 to 100 parts by mass.

2. The curable composition according to claim 1, further comprising a compound having one radically polymerizable carbon-carbon double bond and being different from the bismuth compound and the nitrile compound.

3. The curable composition according to claim 1, wherein the bismuth compound comprises a bismuth compound in which salicylic acid or (meth)acrylic acid and a phosphoric acid ester having a (meth)acryloyl group are bonded to bismuth.

4. The curable composition according to claim 1, further comprising:

at least one compound selected from a compound represented by the following formula (1):

(1)

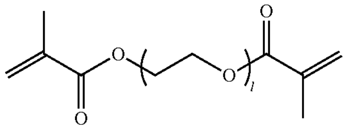

wherein 1 represents an integer of 7 to 14; and a compound represented by the following formula (2):

(2)

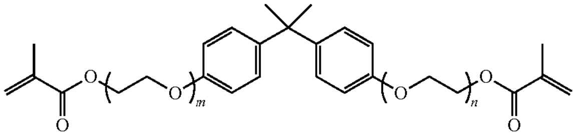

wherein n and m each independently represent an integer of 1 to 15, and n+m=2 to 30.

5. The curable composition according to claim 1, further comprising a photochromic compound.

* * * * *